UNITED STATES PATENT OFFICE.

ALBRECHT SCHMIDT, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

STABLE CONCENTRATED PREPARATION FOR THE INDIGO FERMENTATION-VATS.

1,239,526.

Specification of Letters Patent. Patented Sept. 11, 1917.

No Drawing. Application filed November 13, 1914. Serial No. 871,963.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Stable Concentrated Preparations for the Indigo Fermentation-Vats, of which the following is a specification.

The action of the so-called "cold oriental indigo-vats" is due, for the most part, to phenomena of fermentation. They are caused by bacteria which require for their existence and growth nitrogenous nutrient media and consequently it has been found that by adding fermentable but non-nitrogenous bodies, such as glucose, cane sugar, starch, etc., a cold fermentation-vat cannot be satisfactorily started and continuously kept working. In practice there has already for a long time been used as "fermentable materials" as they were called, besides syrup, starch, glucose, etc., also bran, which, as is known, contains vegetable albumin *i. e.* nitrogenous material. It has been attempted to mix stable-indigo and indigo-white pastes with "vat-fermentation agents" with the addition of alkalis in order to convert them thereby into a stable form. Thus, according to a well known process 200 parts of indigo are made into a paste with 100 parts of wheat-flour, 50 parts of syrup, 10 parts of quick lime and 540 parts of water. This process shows, however, the disadvantage that the paste thus obtained becomes putrefied and ferments as soon as the alkaline reagent disappears for some reason, for instance in consequence of the lime being consumed by the carbonic acid in the air.

Now I have found that stable concentrated albumin preparations can be obtained which retain their action in the cold indigo fermentation-vat, by mixing isolated albumin substances, containing or not containing bacteria, with water-soluble carbohydrates, for instance with molasses, glucose or the like, or with equivalents of water-soluble carbohydrates of high concentration, for instance glycerin. Thus valuable stable albumin-preparations are obtained either by mixing a concentrated water-soluble carbohydrate, for instance with the moist extract containing a high percentage of albumin (gluten), obtainable by extracting or boiling bran or an albuminous seed with water and, if required, subsequently evaporating; or, for instance, with other albuminous substances (albuminates), such as vegetable casein, casein or the like and also with albumoses, peptonoid products or the like. The high percentage of sugar causes preservation of the albuminous material in spite of its containing water and the sugar itself serves then as one of the fermentation agents in the vat. By such preparations it is possible to start well the so-called cold lime-fermentation-vat and to keep it working. The indigo-vats prepared with such albuminous and sacchariferous products show a considerably better condition than those prepared for instance with glucose without said albuminous products added; the deposit of the vat, when agitated, shows a pure yellow color which is not the case with the ordinary glucose-lime vat; the vat has not so great a tendency to deposit, etc., and works in many respects better than the ordinary glucose-lime-vat owing to the albumin it contains.

These mixtures of albuminous extracts and concentrated water-soluble carbohydrates have the following properties: They give the chemical reactions of the albumins (biuret reaction) and also those of the water-soluble carbohydrates (in the inverted state, reduction of Fehling's solution); when exposed to the air or left at rest, they do not putrefy but when diluted with water putrefaction sets in at once; when introduced into the indigo-vat, they revive the latter, *i. e.* they set it in action that is to say, the indigo is soon reduced. If with such liquid albuminous carbohydrates are incorporated at the same time indigo or indigo-white or the known indigo-white mixtures, for instance mixtures of indigo-white and zinc dust and carbohydrates, there are obtained also indigo- and leuco-indigo preparations which can be directly used.

By "water-soluble carbohydrates" are to be understood in the foregoing specification the water-soluble carbohydrates as such and, of course, also glycerin, this being an entire technical equivalent thereof.

Example: 10 kg. of rye-bran are extracted in about 50 liters of cold or warm water and the residues of the bran are separated by filtration or centrifugation. The extracted liquid, which may be further diluted, is then evaporated, preferably in a vacuum, so as to turn into a syrup-like mass which is then mixed with 3 kg., or more or less, of molasses according as required. The paste thus obtained is indefinitely stable and suitable for transport; it does not putrefy and dry up. The respective albuminous substance may be incorporated with the water-soluble carbohydrate also in a more purified or purer form by using for instance instead of the extract or the gluten, the vegetable casein produced therefrom or another albuminate or other casein-like substances, albumoses, peptonoid products or the like or also their salts. If it is intended to incorporate indigo with all of these albuminous carbohydrate-pastes, the procedure is apart from the addition of indigo the same as above indicated; it is only advantageous to increase in this case the quantity of the molasses, invert-sugar, glucose, maltose, glycerin, etc.

If indigo-white is added to the concentrated pastes produced from liquid albuminous extracts and water-soluble carbohydrates, such as molasses, invert-sugar, glucose, maltose, glycerin, etc., there are obtained concentrated, stable indigo-white products.

When preparing solid preparations—with or without adding indigo or indigo-white—the mixture is evaporated to dryness or volatized, preferably *in vacuo* or in a current of air, so that the last remainder of water is removed. The water-soluble carbohydrate contained therein renders it also possible, owing to the sugar it contains, to easily transform the nitrogenous organic substance into a paste when the respective preparations are moistened with water, to retain the substance in a hydrated state and to prevent it from sticking together.

In making such concentrated albuminous-carbohydrate preparations there may be added, besides the bacteria which may perhaps be contained in the albuminous raw products themselves, other materials containing bacteria, such for instance as finely cut hay, or hay-tea or the like or portions of a fermentation liquor of lactic acid or butyric acid; by using the concentrated sugar solution these bacteria are at the same time rendered latent and preserved.

Having now described my invention, what I claim is:

1. In the art of indigo dyeing, the process of reviving the indigo vat and reducing the indigo, which consists in adding to the bath a mixture containing a concentrated albuminous product and a water-soluble concentrated carbohydrate, said mixture characterized by giving the chemical reactions of the two components, viz., the albumin- and sugar-reactions, and having the property of not putrefying when exposed to the air but of undergoing putrefaction when diluted with water.

2. As new products, mixtures of concentrated albuminous extracts and water-soluble carbohydrates and indigo, which mixtures are characterized by giving the chemical reactions of the components, namely the albumin-, sugar- and indigo-reactions, having the property of dyeing in a reduced state cotton and wool a blue color, of not putrefying when exposed to the air but undergoing putrefaction when diluted with water, and of dyeing, when diluted with water and rendered alkaline by means of lime, after some time, cotton and wool blue tints.

3. As new products, mixtures of concentrated albuminous extracts and water-soluble carbohydrates and indigo-white, which mixtures are characterized by giving the chemical reactions of the components, namely the albumin-, sugar- and indigo-white reactions, having the property of dyeing in an alkaline solution cotton and wool a blue color, of not putrefying when exposed to the air but undergoing putrefaction when diluted with water, and of dyeing, when diluted with water and rendered alkaline by means of lime, cotton and wool blue tints.

4. As a new product, a solid, substantially water-free composition consisting essentially of indigo, a water-soluble carbohydrate, and an albuminous substance.

5. As a new product, a solid substantially water-free composition consisting essentially of indigo-white, a water-soluble carbohydrate, and an albuminous substance.

In testimony whereof I affix my signature in presence of two witnesses.

ALBRECHT SCHMIDT.

Witnesses:
 JEAN GRUND,
 CARL GRUND.